March 31, 1942.  M. J. LANDGRAF  2,278,125
FOOD MIXER
Filed April 27, 1939   2 Sheets-Sheet 1
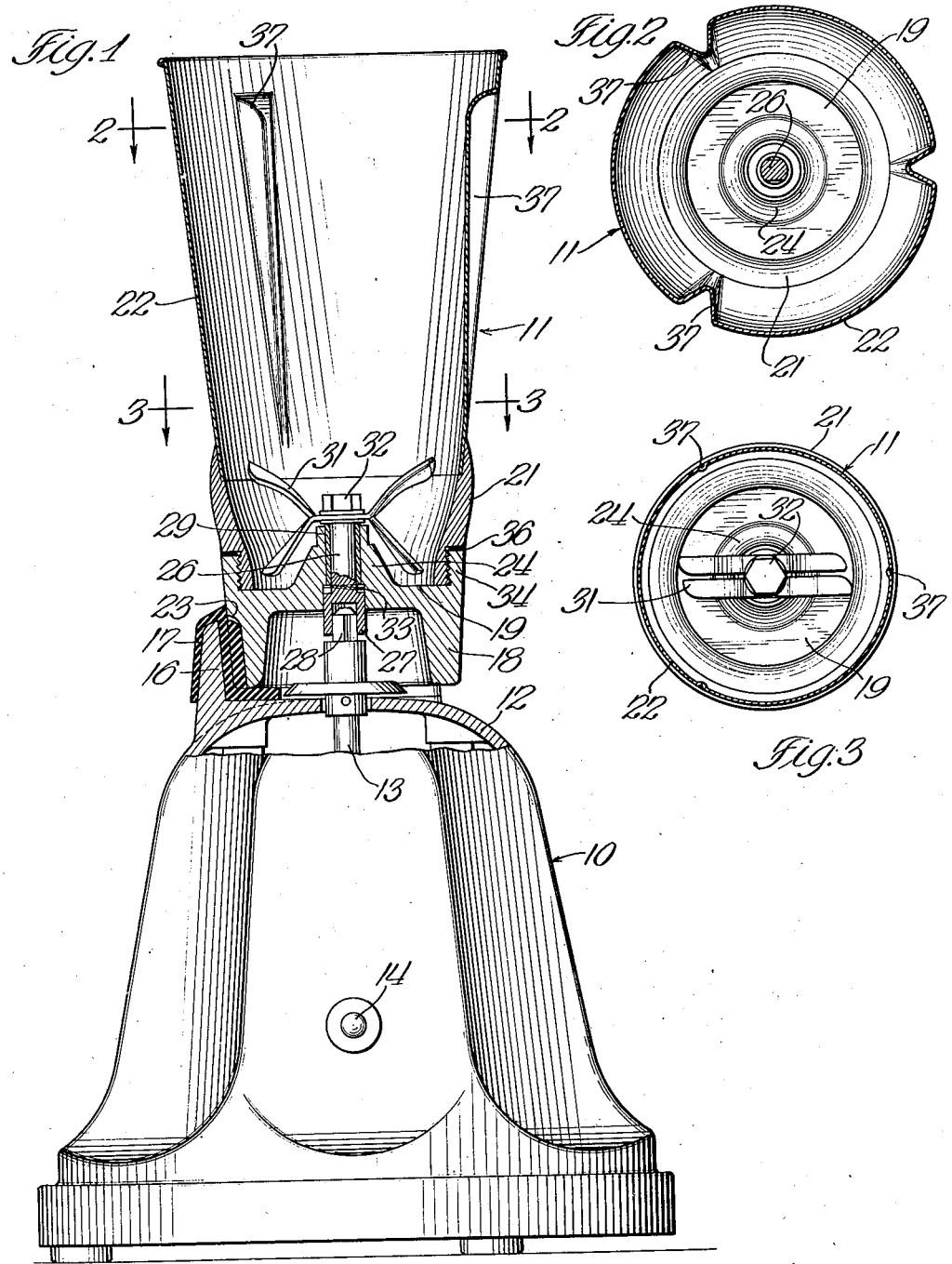
INVENTOR.
Myron J. Landgraf
BY McLaughlin + Wallenstein
ATTORNEYS March 31, 1942.  M. J. LANDGRAF  2,278,125
FOOD MIXER
Filed April 27, 1939  2 Sheets-Sheet 2

INVENTOR.
Myron J. Landgraf
BY McLaughlin & Wallenstein
ATTORNEYS

Patented Mar. 31, 1942

2,278,125

UNITED STATES PATENT OFFICE 2,278,125

FOOD MIXER

Myron J. Landgraf, Chicago, Ill., assignor to Henry J. Goldblatt, Chicago, Ill.

Application April 27, 1939, Serial No. 270,319

2 Claims. (Cl. 259—108)

My invention relates in general to mixing devices.

In my copending application, Serial No. 270,320, filed April 27, 1939, I disclose a mixing device having certain definite advantages over other similar mixing devices known in the industry. Mixing devices of this type at times are difficult to keep clean due to the fact that the mixing blades are substantially permanently located in the bottom of the mixing bowl and instruments are not readily introduced for cleaning purposes. I have found that, if such a mixing device is made from suitable materials, there is little or no problem with respect to cleanliness, but, in any case, there is some advantage in having the parts more easily available for cleaning purposes. Moreover, due to the special and intricate shape which the mixing bowl takes in order to secure a suitable mixing operation, and the fact that materials resistant to corrosion are preferably employed, such as stainless steels, the cost of manufacture tends to be out of line with what it should be in equipment of this general class.

The principal object of my present invention is the provision of an improved food mixer of the general character disclosed in my copending application.

Another object is the provision of an improved manner of constructing the mixing bowl.

Still another object is the provision of a mixing bowl which can be separated for cleaning and which may, in general, be inexpensively produced.

A further object is to utilize in a mixing bowl substantially standard types of apparatus whereby the cost of production may be decreased.

In the drawings, I show two embodiments of the invention, both embodiments having common features, and some features being individual to each embodiment.

Looking at the drawings, therefore,

Fig. 1 is a vertical sectional view, partly in elevation, showing a food mixer made in accordance with my present invention;

Fig. 2 is a sectional view, taken on the line 2—2 of Fig. 1, looking in the direction of the arrows;

Fig. 3 is a sectional view taken on the line 3—3 of Fig. 1, looking in the direction of the arrows;

Figures 4, 5:
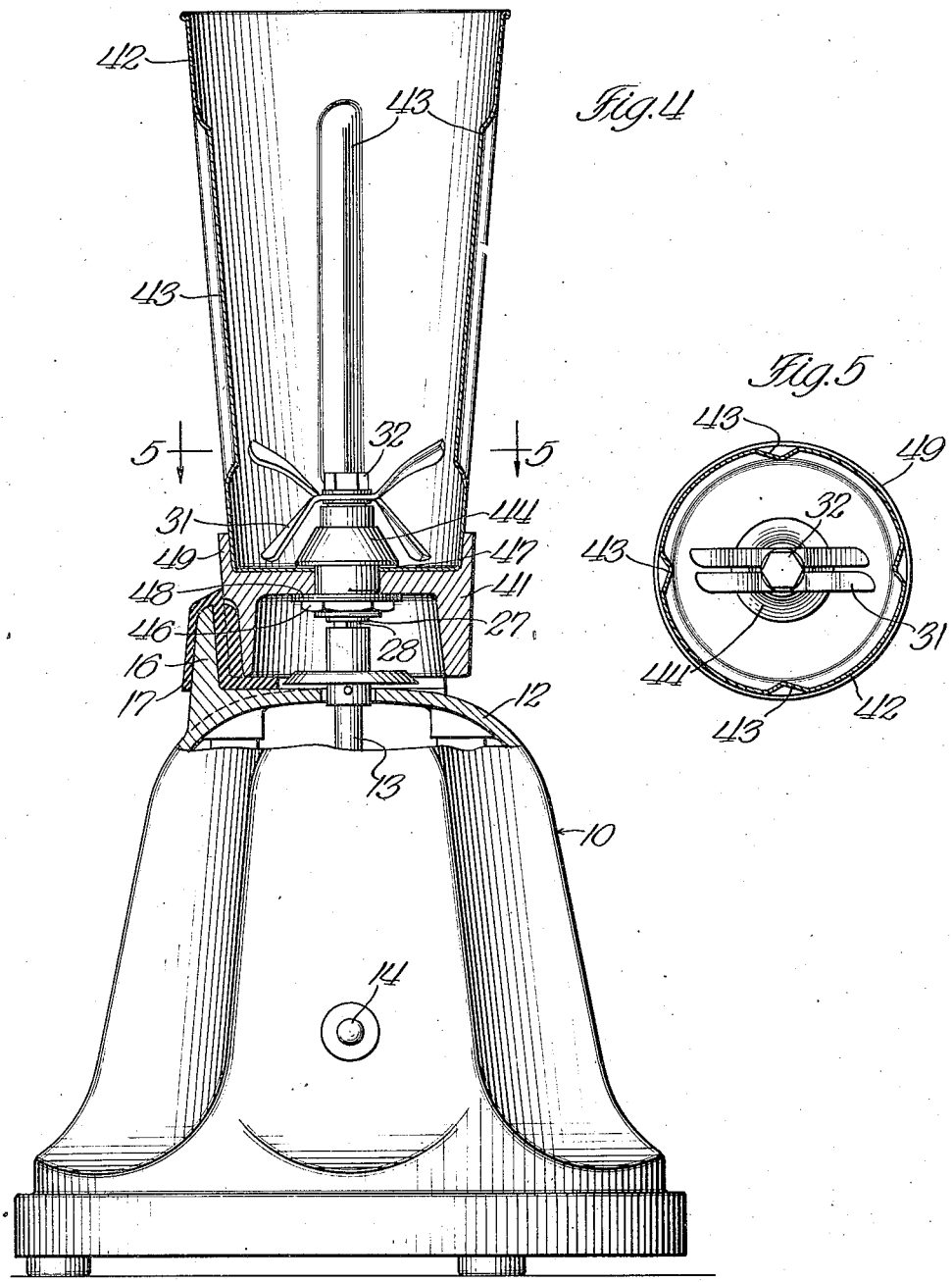
Fig. 4 is a vertical sectional view, partly in elevation, showing a modified construction.
Fig. 5 is a sectional view taken on the line 5—5 of Fig. 4 looking in the direction of the arrows.

The mixing device, as shown in the embodiment of Fig. 1, comprises a unit 10 which is at the same time a drive mechanism and a support or stand for a mixing bowl indicated generally by the reference character 11. The mixing bowl is readily separable from the unit 10, a driving connection being automatically disconnected on its removal.

The unit 10 includes a housing 12 within which a suitable electric motor, not shown, is supported, which motor drives a shaft 13 at a relatively high rate of speed, in a preferred construction a speed of the order of twenty-two thousand revolutions per minute. A suitable switch 14 is employed to control delivery of current to the motor, although the switch mechanism shown in my co-pending application may be utilized to advantage. Indeed, the features of the unit 10 may be identical with those shown in the copending case, although these details are not necessarily followed so far as the use of the present invention is concerned. Integral with the housing 12 are a plurality of upright supporting projections, one of which is shown at 16 in the drawings, three being the preferred number. These projections are covered with a vibration damping material such as rubber 17.

The mixing bowl assembly comprises a lower casting member 18 easily separable from an upper portion along a line substantially coincident with the top surface 19 of the casting member 18, which top surface comprises the bottom surface of the bowl's interior. The top portion of the bowl comprises an annular member 21 which may be a casting, machined to produce the proper finish, and a generally cylindrical but tapering section 22. It may be noted that the inside surface of the annular member, looked at in vertical section, is straight immediately above the bottom, and then slightly concave before it meets the cylindrical member 22. Materials from which these parts are formed will be referred to later and also the detailed construction and preferred manner of forming them. It will be noted that the generally cylindrical member 22 is thin-walled and fits into the inside of the member 21 with its end abutting an annular shoulder formed on the member 21. The parts are secured together in a suitable manner such as by brazing, welding, soldering, and the like, so that a smooth and continuous inner surface is provided.

Referring now again to the member 18, this member has a downwardly projecting annular portion containing outside recesses 23 receiving the projections 16 whereby to support the unit 11 as a whole on the unit 10. Integral with the member 18 is a generally conical portion 24, and a vertical hole is provided entirely through the conical portion 24 and through the bottom wall for the passage of a drive shaft 26. This drive shaft is formed of a slightly enlarged socket portion 27 at its bottom, the socket in this portion being non-circular to receive a non-circular extension 28 of the drive shaft 13. A cylindrical bearing member 29 is interposed between the shaft 26 and a conical portion 24. An impeller 31 is secured to the top of the shaft 26 by a nut 32, washers being provided above and below the impeller. A split ring washer 33 is placed between the bottom edge of the bearing 29 and a shoulder formed on the socket portion 27. This construction is similar to that shown in my copending application, the purpose being to provide for free operation of the impeller while still sealing against leakage around the shaft.

The annular member 21 which comprises a part of the bowl proper is provided with threads as shown, the threaded portion being inset from the exterior surface to form a shoulder. An annular upwardly extending portion 34 of the member 18 is interiorly threaded. The parts are so dimensioned as to provide a pair of engaging surfaces in the nature of shoulders, one of the annular member 21 against the surface 19 and the other of the shoulder on the outside of the annular member 21 against the top surface of the annular extension 34. This provides a large sealing surface so that an adequate seal is obtained while still permitting a threaded connection which is easily operated by the hands and without the use of tools. To further seal, I may utilize a washer 36, this washer having the double function of acting as a seal and also of compensating for any slight variations in dimensions which may occur during manufacture.

The interior surface of the annular member 21 is round, that is, at any portion of this member a cross section will show a circular interior surface. The portion 22, however, preferably is made irregular. While it may have a hexagonal shape in the portion above the point of its engagement with the annular member 21, I have found that generally adequate mixing action is obtainable with the shape shown. As Fig. 1 shows, particularly taken with Fig. 2, a plurality of baffles 37 are formed in the generally cylindrical member 22 and these baffles taper toward the bottom; that is to say, they extend the maximum distance from the side walls at the top. This tapering character of the baffles 37 is obvious from a comparison of Figs. 2 and 3.

The mixing action obtainable with the device constructed in accordance with Figs. 1 to 3, inclusive, is similar to that described in connection with my copending application. The impeller 31 may be identical with the impeller shown in the copending application, although the remaining features of the invention may be utilized with an impeller of modified shape. The action generally is centrifugal in the lowermost portion of the mixing bowl, the outflaring character of the bowl causing the materials being mixed to rise in the bowl until they strike the baffles. The baffles gradually break up the rotating and upwardly advancing movement of the materials in the bowl until the uppermost portion of the baffle is reached at which time the material is finally completely diverted inwardly and downwardly toward the center with a component of movements such that thorough mixing takes place and the material moves downwardly in the center and upwardly at the sides, continuously coming in contact with the impeller. Solid particles are retained in the region in which the impeller operates, until they are broken up sufficiently to move readily with the fluid matter. This action is described in detail in my copending application. Fruits, vegetables and the like are reduced to pulp in a very short time and a thorough mixing takes place.

The manner of forming the bowl of Fig. 1 and the materials utilizable for its formation should, in general, be apparent to those skilled in the art from a study of the construction. The member 18 is preferably a machined casting and stainless steel is a suitable material from which to fabricate it. It may, however, be formed of other materials and coated in a suitable manner as, for example, with chromium. The annular member 21 may be formed in the same way. The member 22 may be formed of sheet material such as by a drawing operation or a preformed cylinder may be tooled as, for example, in a press. At any rate, it may be formed of a relatively light material and by an inexpensive operation. Stainless steel is suitable for the purpose, although other types of materials such as nickel silvers and the like may be utilized. As a further illustration, the members 21 and 22 may be formed in one piece of glass, with threads at the bottom engaging directly in the member 18.

By unscrewing the upper portion of the bowl from the section 18, the lower inside portion of the bowl, the impeller and all of the parts are accessible for easy cleaning. It will be noted that there is no crevice at the bottom of the bowl in which particles may lodge and, so far as the impeller assembly is concerned, this may be removed on occasion should it be deemed necessary to do so to insure that the last trace of food material is removed from around the top of the member 24. In other words, the maximum possible cleanliness in a device of this general character may be maintained.

In the form of mixer shown in Fig. 4, some of the same general features described in connection with Fig. 1 are present. The lower unit 10 may be identical and, for convenience, I have applied the same reference characters thereto. The upper or mixing bowl assembly comprises a lower member 41 which may be a machined casting shaped at its lower exterior to fit on the projections 16 in the manner described in connection with the embodiment of Fig. 1. The main feature of Fig. 4 is the provision of a device which combines adequate mixing and pulping operations for my purposes with extreme simplicity of manufacture. The bowl 42 may be a standard mixing bowl, such as employed in many drug store fountains, with baffles 43 suitable in number to promote a mixing and turning action of materials driven toward the upper part of the bowl by the impeller action. The impeller may be identical with that used in the embodiment of Fig. 1 and its mounting on the shaft 26 may be the same. The bearing arrangement, however, is such as to not only support the shaft but also to facilitate assembly of the bowl 42 to its support member 41.

The bowl 42 is apertured at the bottom to pass a narrowed shank portion of a member 44, conical at the top and threaded at the bottom to receive a nut 46. A suitable washer 47 is disposed between the conical portion 44 and the contiguous portion of the bottom of bowl 42, and suitable washers 48, such as a combination of a rubber washer and a metal washer, are disposed between the nut 46 and the lower surface of the member 41. The member 41 has an annular upstanding flange 49 and it is finished within the inside of the flange 49 and on its upper surface so that the bottom of the bowl will fit snugly in position when the nut 46 is tightened. With this construction, it is clear that the food material within the bowl 42 never comes in contact with the member 41 and it is unnecessary to have a sealed connection at any point of engagement between the member 41 and the member 42, merely a snug engagement such as to produce a substantially integral structure being all that is necessary. A seal, of course, is required such as is provided by the washer 47. This washer may be solid tin or a suitable material of this kind which is at the same time soft and resistant to corrosion. The means for providing a seal around the drive shaft may be the same as described in connection with the embodiment of Fig. 1.

The bowl 42 may be formed of glass, if desired, and in such an event the baffles 43 must be designed in such a way as to permit ready removal of a mold from the inside of the glass body. The use of a glass bowl not only has an advantage from the standpoint of cleanliness but it also allows for inspection of the material within the bowl during a mixing operation.

What I claim as new and desire to protect by Letters Patent of the United States is:

1. In a mixing device of the character described, a bowl member adapted for attachment to a motor housing from which a driving shaft projects upwardly, said bowl member comprising a casting having an apertured horizontal portion, a depending flange portion forming a cup-like lower recess, and an upper flange portion forming a cup-like upper recess, a separate generally tapered member forming side walls of the bowl, said member extending into the cup-like upper recess whereby said tapered member forms the entire side wall of the bowl and the bottom is coincident with a top surface of the horizontal portion of the bowl member casting, a frusto conical member projecting upwardly centrally of the bottom of the bowl, said frusto conical member having an aperture in line with the aperture in said horizontal portion, an impeller shaft extending through said apertures, and an impeller carried thereby immediately above the frusto conical member, the lower portion of the bowl near said impeller being of restricted cross section, and said impeller having a plurality of upwardly and downwardly inclined blades the area of rotation of which substantially fills the said lower portion of the bowl, said generally tapered member forming the side walls being of circular cross section at the lower portion occupied by the impeller and of a non-circular cross section above said lower portion.

2. In a mixing device of the character described, a bowl assembly for attachment to a base from which a motor driven shaft projects upwardly, said bowl assembly comprising a support member in the form of a casting having an apertured horizontal portion, a depending flange portion forming a cup-like lower recess and an upper flange portion forming a cup-like upper recess, a thin-walled drawn bowl member having side walls and bottom nested in said cup-like upper recess, said side walls of the bowl member having a lower portion of circular cross-section, and said bottom having an aperture aligned with the aperture in the horizontal portion of said support member, a shaft extending through said apertures, nuts on said shaft at opposite sides of the assembly for holding the bowl member in position in said cup-like upper recess, a frusto conical portion surrounding said shaft in the said lower portion of the bowl, and an impeller secured to the upper end of said shaft and having upwardly and downwardly projecting blades, the area of rotation of which substantially fills the lower portion of the bowl occupied by said frusto conical projection.

MYRON J. LANDGRAF.